Patented Aug. 5, 1947

2,425,269

UNITED STATES PATENT OFFICE 2,425,269

DICHLOROBENZALACETONE

Raymond B. Seymour and David T. Mowry, Dayton, Ohio, assignors to Monsanto Chemical Company, St. Louis, Mo., a corporation of Delaware No Drawing. Application April 15, 1944, Serial No. 531,281

1 Claim. (Cl. 260—590)

The present invention relates to nuclearly chlorinated derivatives of benzalacetone and more particularly to dichloroacetones and to a method of preparing the same.

An object of the present invention is to prepare new and useful chlorine derivatives of benzalacetone. Another object of the invention is to provide new copolymerizing materials for the plastics and synthetic rubber industries.

These and other objects which will be hereinafter disclosed are provided by the following invention wherein there are prepared nuclearly chlorinated derivatives of benzalacetone having the general structure:

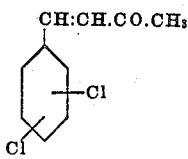

Compounds having the above general formula are: 2,3-dichlorobenzalacetone, 2,4-dichlorobenzalacetone, 2,5-dichlorobenzalacetone, 2,6-dichlorobenzalacetone, 3,4-dichlorobenzalacetone, 3,5-dichlorobenzalacetone.

The nuclearly dichlorinated derivatives of benzalacetone are clear, limpid liquids which solidify at low temperatures. They are particularly useful in the preparation of new, heat- and solvent-resistant resinous or rubbery copolymer, the production of the rubbery copolymers, for example, being the subject of a copending application, Serial No. 531,282, filed April 15, 1944, filed in the name of one of us.

Dichlorobenzalacetones having the above general formula may be readily obtained in good yields by reaction of a nuclearly dichlorinated benzaldehyde with acetone in the presence of a basically reacting material substantially according to the equation:

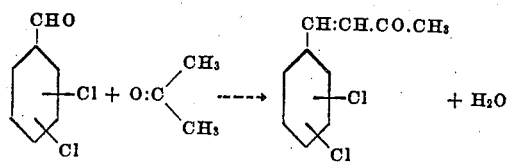

The dichlorobenzalacetones are also obtainable by a number of other procedures, for example, by reaction of nuclearly dichlorinated cinnamonitriles with methyl magnesium iodide or by heating dichlorinated cinnamaldehydes with methanol in the presence of zinc chloride.

As far as we have been able to ascertain, the dichlorobenzalacetones have not previously been known. While we are aware of the prior preparation of nuclearly mono-chlorinated benzalacetones by methods which are generally known to be useful for the prepartion of nuclearly substituted derivatives of benzalacetone, it could not have been predicted that the dichlorinated compounds could be similarly prepared for nuclear chlorine is known to have an inhibiting effect on a number of reactions. Also, the great usefulness of the dichlorobenzalacetones in the production of rubbery copolymers could not have been foretold. It has been found, for example, that while benzalacetone, the mono-chlorobenzalacetones and the dichlorobenzalacetones all undergo copolymerizing reactions with butadiene compounds, the copolymers obtained from dichlorobenzalacetone and butadiene are particularly distinguished by a high per cent elongation and smooth extrusion. The per cent elongation of a 2,6-dichlorobenzalacetone copolymer, for example, is about 20% greater than that of a 4-chlorobenzalacetone-butadiene copolymer, as disclosed in the copending application, referred to above. Moreover, the dichlorobenzalacetone-butadiene copolymers have greater heat- and solvent-resistance and stability to aging.

The present dichlorobenzalacetones are likewise advantageously employed in the production of resinous products by copolymerization of the same with other olefinic compounds, particularly with compounds containing the vinyl (—CH:CH₂) or vinylidene (>C:CH₂) group. As such copolymerizable compounds may be mentioned, for example, styrene and nuclear or chain-substituted derivatives thereof, for example, ortho-, meta- or para-methyl, ethyl or isopropyl styrene, ortho-, meta- or para-chloro, fluoro or bromostyrene, alpha-methylstyrene, alpha, para-dimethylstyrene, alpha-chlorostyrene, para-cyanostyrene, para-nitrostyrene, vinylphenol, etc.; acrylic or methacrylic acid or derivatives thereof such as ethyl or methyl acrylate or methacrylate, acrylonitrile or methacrylonitrile, acrylamide or methacrylamide, etc.; vinyl or vinylidene halides such as vinyl chloride, vinyl fluoride, vinylidene chloride or 1,1-chlorofluoroethylene; unsaturated ketones such as methyl vinyl ketone or methyl isopropenyl ketone; vinyl esters such as vinyl acetate, vinyl propionate or vinyl butyrate; vinyl ethers such as methyl vinyl ether, divinyl ether, etc.

The present invention is further illustrated, but not limited, by the following example:

*Example*

111 g. (0.635 mol) of 2,6-dichlorobenzaldehyde and 128 ml. of acetone (101 g., 1.79 mols) are added, with stirring to 64 g. of water contained in a 1-liter, 3-necked flask equipped with dropping funnel, thermometer and reflux condenser. To the resulting mixture there is then slowly added with stirring a solution of 1.5 g. of sodium hydroxide in 16 ml. of water, the reaction mixture being kept at a temperature of from 25° C. to 30° C. during the addition of the alkali. This temperature is also preferably maintained for one hour after addition of the alkali has been completed, the reaction mixture being stirred during this period. At the end of this time the product is extracted with from 400 to 500 ml. portions of benzene, the extract is filtered and the filtrate is washed with water. Distillation of the filtrate, yields after removal of low-boiling material a fraction B. P. 156–159° C./101.5 mm. in 55% yield (72 g.). This fraction, which gives a qualitative test for carbonyl and for aliphatic unsaturation and shows by elementary analysis the required amount of chlorine is substantially pure 2,6-dichlorobenzalacetone, $n_D^{25}$, 1.5887, M. P. 4.5° C.

The other dichlorobenzalacetones are similarly prepared, i. e., by reacting 2,3-dichlorobenzaldehyde, 2,4-dichlorobenzaldehyde, 2,5-dichlorobenzaldehyde, 3,4-dichlorobenzaldehyde and 3,5-dichlorobenzaldehyde with acetone in presence of a basic reacting material.

As a basic reacting material there may be employed, instead of the sodium hydroxide of the above example, other inorganic alkalies, for example, sodium carbonate, potassium hydroxide or potassium carbonate or organic bases such as pyridine, diethylamine, isopropanolamine, etc. An acidic dehydrating agent may likewise be employed, for example sulfuric acid or phosphorus pentoxide, or the reaction may be effected in the absence of either an acidic or basic condensing agent. However, in the absence of a condensing agent, higher temperatures and reaction periods are advantageously employed. Also, when the condensation is effected in the presence of alkaline or basic materials, the permissible range of temperature may be widely varied, the conditions of time and temperature varying with the amount and nature of the condensing agent employed, the quantities of reactants used, and the presence or absence of agitation.

Condensation of the dichlorobenzaldehydes with acetone may be conducted in the absence of water if there is employed either no condensing agent or a condensing agent which is soluble in either the aldehyde or the acetone, the use of water in the above example being required only because the sodium hydroxide is substantially insoluble in the reactants. Since the condensation in presence of condensing agents is usually exothermic, however, it is wise to employ a diluent, which may be water, an excess of one of the reactants or an extraneous inert solvent such as benzene, nitrobenzene, etc. Also, when working in the presence of condensing agents provision should be made for the dissipation of reaction heat, for example, by immersing the reaction vessel in an ice-water mixture.

In the absence of condensing agents, added pressure may be advantageously employed and the reaction may be effected in the absence of a diluent.

Although it has been found that the present dichlorobenzalacetones are particularly valuable as copolymerizing agents for butadiene compounds in the production of synthetic rubbers and as copolymerizing agents for vinyl compounds in the preparation of synthetic resins, the dichlorobenzalacetones also find use as intermediates in the production of other useful industrial materials. By reaction with hydrogen cyanide they are converted into compounds which may be used as insecticides and fungicides and by reaction with amino compounds, particularly long-chained N-alkyl amines into materials which find use as fire-proofing plasticizers.

It is to be understood that the foregoing detailed description is given merely by way of illustration and that many variations may be made therein without departing from the spirit of the invention which is limited only by the following claim.

What we claim is:

2,6-dichlorobenzalacetone, this compound melting at 4.5° C. and having a refractive index $n_D^{25}$ of 1.5887.

RAYMOND B. SEYMOUR.
DAVID T. MOWRY.

REFERENCES CITED

The following references are of record in the file of this patent:

UNITED STATES PATENTS

| Number | Name | Date |
|---|---|---|
| 2,199,389 | Britton | May 7, 1940 |
| 2,278,638 | Barnes | Apr. 7, 1942 |
| 2,326,315 | Williams | Aug. 10, 1943 |

OTHER REFERENCES

Beilsteins Hanbuch der Organsche Chemie, vol. 7, p. 367, 1925.